(12) United States Patent
Oka (10) Patent No.: US 6,688,102 B2
(45) Date of Patent: Feb. 10, 2004

(54) TRAVELING CONTROL DEVICE

(75) Inventor: Hidekazu Oka, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 85 days.

(21) Appl. No.: 10/084,046

(22) Filed: Feb. 28, 2002

(65) Prior Publication Data

US 2002/0133280 A1 Sep. 19, 2002

(30) Foreign Application Priority Data

Mar. 15, 2001 (JP) ........................................ 2001-074339

(51) Int. Cl.⁷ .............................................. F16D 31/02
(52) U.S. Cl. ............................ 60/422; 60/449; 60/448; 180/6.2; 180/6.48
(58) Field of Search .......................... 60/422, 445, 448; 180/6.2, 6.48

(56) References Cited

U.S. PATENT DOCUMENTS

| | | | | |
|---|---|---|---|---|
| 3,672,161 A | * | 6/1972 | Krusche et al. | ................ 60/445 |
| 3,987,626 A | * | 10/1976 | Bianchetta | .................... 60/445 |
| 4,055,046 A | * | 10/1977 | Schexnayder | ................ 60/445 |
| 4,458,485 A | | 7/1984 | Seelmann | |
| 4,599,855 A | * | 7/1986 | Seelman | ........................ 60/444 |
| 5,048,293 A | * | 9/1991 | Aoyagi | ........................ 60/420 |
| 5,446,979 A | * | 9/1995 | Sugiyama et al. | ............ 60/422 |
| 5,542,251 A | | 8/1996 | Leibing et al. | |

FOREIGN PATENT DOCUMENTS

| | | |
|---|---|---|
| EP | 0 593 782 | 4/1994 |
| GB | 1 131 750 | 10/1968 |
| JP | 62 055271 | 3/1987 |

* cited by examiner

Primary Examiner—Edward K. Look
Assistant Examiner—Igor Kershteyn
(74) Attorney, Agent, or Firm—Oblon, Spivak, McClelland, Maier & Neustadt, P.C.

(57) ABSTRACT

The present invention discloses a traveling control device, including a crawler type right and left traveling body; a right and a left hydraulic motor for operating the right and left traveling body said right and left hydraulic motors each having a pump as a hydraulic source; an operator means for outputting an operation command to the right and the left hydraulic motor; and a pump pressure controller means for controlling pump pressure to be supplied to the right and the left hydraulic motor according to a control input of the operator means, wherein the pump pressure controller means controls the pump pressure based on different pump pressure properties for single traveling in which only one of hydraulic motors is operated, and for double traveling in which both of hydraulic motors are simultaneously operated. Therefore, by designing different properties of the pump pressure to be applied to the single traveling and the double traveling, the manipulation ability of the traveling control device is greatly improved.

16 Claims, 6 Drawing Sheets

TRAVELING CONTROL DEVICE

BACKGROUND OF THE INVENTION

1. Field of the Invention

The present invention relates to a traveling control device to be applied to construction machinery equipped with a crawler type traveling body like a hydraulic excavator.

2. Description of the Related Art

The prior art will be described hereinafter with hydraulic excavator by way of example.

Figure 6:
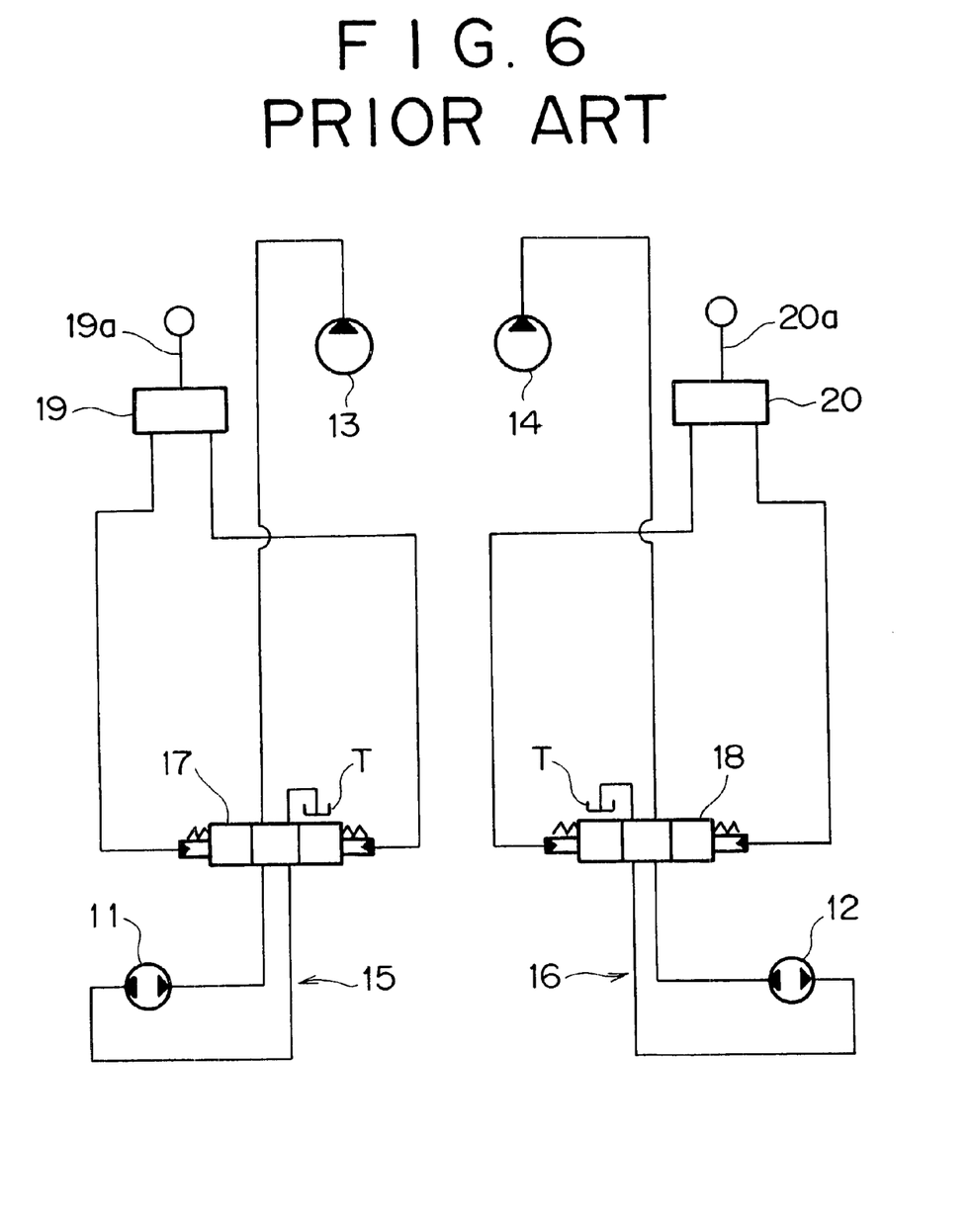
FIG. 6 is a schematic diagram of a hydraulic circuit in a traveling control device in the related art.

The conventional traveling control device (a hydraulic circuit) for controlling the operation of the crawler type traveling body in the hydraulic excavator is depicted in FIG. 6.

As shown in FIG. 6, the traveling control device is constituted with a hydraulic motor for a left traveling body 11 and a hydraulic traveling motor for a right traveling body 12 (hereinafter, they are referred to as a left traveling motor, and a right traveling motor). Both traveling motors 11 and 12 are operated by hydraulic pumps 13 and 14 (hereinafter, they are referred to as a left hydraulic pump, and a right hydraulic pump), respectively.

In addition, motor circuits 15 and 16 connect two motors 11 and 12, two (a right and a left) pumps 13 and 14, and a tank T, and hydraulic pilot type control valves 17 and 18 are installed in each circuit. The control valves 17 and 18 are converted and controlled by a remote control pressure from remote control valves 19 and 20 that are operated by levers (or pedals) 19a and 20a. In this way, the rotational direction (forward, backward) and the rotational speed (traveling speed) of both traveling motors 11 and 12 are controlled.

In other words, when the remote control valves 19 and 20 are operated, the control valves 17 and 18 are operated by the stroke in accordance with the control input of the remote control valves, which consequently determining an opening of the valve. And, the flaw rate according to the valve opening is supplied to the traveling motors 11 and 12, raising the pump pressure, and operating the traveling motors 11 and 12.

Incidentally, in the conventional traveling control device, the relation between the control input of the remote control valves 19 and 20 (hereinafter, it is referred to as the control input) and the pump pressure from the reaction manifests exactly the same properties, without any difference in two different cases, such as:

(a) double traveling in which both traveling motors 11 and 12 rotate simultaneously; and (b) single traveling in which only one of the traveling motors 11 and 12 rotates.

However, during the single traveling, since the load operated by one traveling motor is comparatively larger than that of the double traveling, the control input necessary for the operation gets relatively increased. That is, the double traveling can be traveled even at the slight operation, while the single traveling will not start the traveling unless it is operated deeply.

Therefore, during the single traveling, the control input after the operation is small, causing the micro-operational ability within the range of the control input after the operation to be deteriorated.

On the other hand, if the single traveling at a small control input is possible, this speeds up the operation of the double traveling too much (because of the increased sensitivity of the small control input). In result, the traveling may start suddenly, and the micro-operation at the small control input is deteriorated.

SUMMARY OF THE INVENTION

An object of the present invention is to provide a traveling control device for properly applying single traveling as well as double traveling in accordance with its own properties.

The traveling control device of the present invention comprises: a crawler type right and left traveling body; a right and a left hydraulic motors for operating the right and left traveling body, using each hydraulic pump as a hydraulic source; an operating means for outputting an operation command to the both hydraulic motor; and a pump pressure control means for controlling the pump pressure supplied to the double hydraulic motors in accordance with the control input of the operating means. The pump pressure control means controls the pump pressure based on different properties of the pump pressure during the single traveling where only one hydraulic motor is operated, and the double traveling where both hydraulic motors are simultaneously operated.

In the present invention, considering that different properties of pump pressures are applied to the single traveling and the double traveling by the pump pressure control means, the inventors decided to utilize this property of the pump pressure for both single traveling and double traveling by way of improving the operation in overall.

Also, the pump pressure control means of the present invention is devised to control the pump pressure based on the property of the pump pressure, that is, the variation slope of the pump pressure against the control input is greater for the single traveling than for the double traveling.

According to this, the inventors tried to make the variation of the pump pressure be more steep during the single traveling, while be more gentle during the double traveling, trying to improve the micro-operation within the control input after the operation through the greatly increased control input after the operation of the one-side operation. Besides, the present invention can obtain excellent micro-operation even at the small control input during the double traveling. In short, through the present invention, it became possible to obtain excellent manipulation ability for both single traveling and double traveling.

Also, the present invention has a constitution in which said pump pressure control means controls the pump pressure based on a pump pressure property that the control input necessary for a traveling operation for the single traveling and the double traveling is almost equivalent to each other.

According to this, since the control input necessary for the traveling operation becomes almost same for the single traveling and for the double traveling, the manipulation facility thereof gets even better.

Further, the pump pressure control means of the present invention comprises a pressure control valve connected to the motor circuit that connects the hydraulic pump and the hydraulic motor, and a set pressure adjusting means for adjusting the set pressure of the pressure control valve according to the control input of the operating means.

The system aforementioned is particularly for adjusting a set pressure of the pressure control valve out of the control systems to change the properties of the pump pressure during the single traveling and the double traveling.

Also, the pressure control valve of the present invention is a cut valve, which is installed in a bypass line passing through a control valve that controls the operation of the double hydraulic motor. In addition, the pressure control valve throttles the flow rate of the bypass line, and the set pressure adjusting means controls the opening of the cut valve.

The system described above is so called a cut valve control system where the cut valve is used as the pressure control valve, and the opening of the cut valve is controlled eventually for controlling the pump pressure.

Another aspect of the present invention provides the traveling control device using the hydraulic pilot type control valve and cut valve, and a remote control valve as a means for operating the control valve. Also, the set pressure adjusting means of the present invention preferably includes a shuttle valve for withdrawing the remote control pressure from the remote control valve; a cut valve pilot line for connecting the shuttle valve; and a hydraulic pilot port of the cut valve; a hydraulic pilot type traveling switching valve for closing and opening the cut valve pilot line; and a switching valve control circuit for supplying the remote control pressure of the operated side to the traveling switching valve of the opposite side as a pilot pressure to a closing direction of the traveling switching valve.

The system described above is so called a cut valve hydraulic control system that controls the cut valve by the remote control pressure from the remote control valve. Particularly, the system is known for low mechanical trouble rate due to broken wires, and for excellent reliability.

Further, the present invention includes a regulator for regulating the discharge flow rate of the double hydraulic pump, and a negative control valve installed in the bypass line. The negative control valve varies the regulator's input according to the passing flow rate of the bypass line in order to change the pump discharge flow rate.

According to this, as the passing flow rate of the cut valve changes, the pressure inputted in the pump's regulator from the negative control valve also changes, which later changes the pump flow rate. The changed pump flow rate consequently expedites the change in the pump pressure. Thus the present invention is very effective especially when an operator wants to speed up the operation.

Further, the present invention uses either a hydraulic pilot type cut valve or an electronic pilot type cut valve. Here, the set pressure adjusting means outputs an electric control signal for controlling the opening of the cut valve according to the control input of the operating means.

Among other cut valve control systems, the aforementioned system controls the cut valve by the electric control signal (cut valve electric control system). This simplifies the constitution of the hydraulic circuit to a great extent.

Further, the set pressure adjusting means of the present invention includes a controller, and a proportional valve for the cut valve for supplying a secondary pressure according to the electric control signal from the controller to the hydraulic pilot type cut valve in the form of a pilot pressure.

Moreover, the present invention includes the regulator for regulating the discharge flow rate of the double hydraulic pump, and the controller outputs a signal to the regulator for changing the pump discharge flow rate.

According to this, as the passing flow rate of the cut valve changes, the pressure inputted in the regulator also changes, which consequently changes the pump flow rate. The changed pump flow rate again speeds up the change in the pump pressure. Therefore, it is very effective especially when an operator wishes to speed up the operation.

In many cases, a pump controlling proportional valve can be used for the regulator.

Also, in the present invention, the remote control valve is used as the operating means, and the remote control pressure withdrawn by the remote control valve is inputted in the controller as an operational signal.

Preferably, the pressure control valve of the present invention is a relief valve. The relief valve is installed in the motor circuit, and its set pressure is variable. That is, the set pressure adjusting means adjusts the set pressure of the relief valve.

Also, in the present invention, the pump pressure control means preferably includes the regulator for regulating the discharge flow rate of the double hydraulic pump, and the controller for sending the command signal concerning the discharge flow rate of the double hydraulic pump out to the regulator in accordance with the control input of the operating means.

The constitution described above is particularly based on the pump control system for controlling the pump flow rate out of other control systems for changing the properties of the pump pressure during the single traveling and the double traveling. When this system is applied, the hydraulic circuit itself does not require any reconstruction, which means that the hydraulic circuit is applicable even to the conventional equipment.

Moreover, the regulator can be a proportional valve for pump control.

Also, in the present invention, the remote control valve is used for the operating means, and the remote control pressure withdrawn by the remote control valve is inputted in the controller in the form of the operational signal.

DESCRIPTION OF THE PREFERRED EMBODIMENTS

Preferred embodiments of the present invention will now be described with reference to the accompanying FIG. 1 to FIG. 5.

First of all, the first and the second embodiments of the present invention introduce a cut valve control system. Meanwhile, the third embodiment of the present invention is based on a pump control system.

Figure 1:
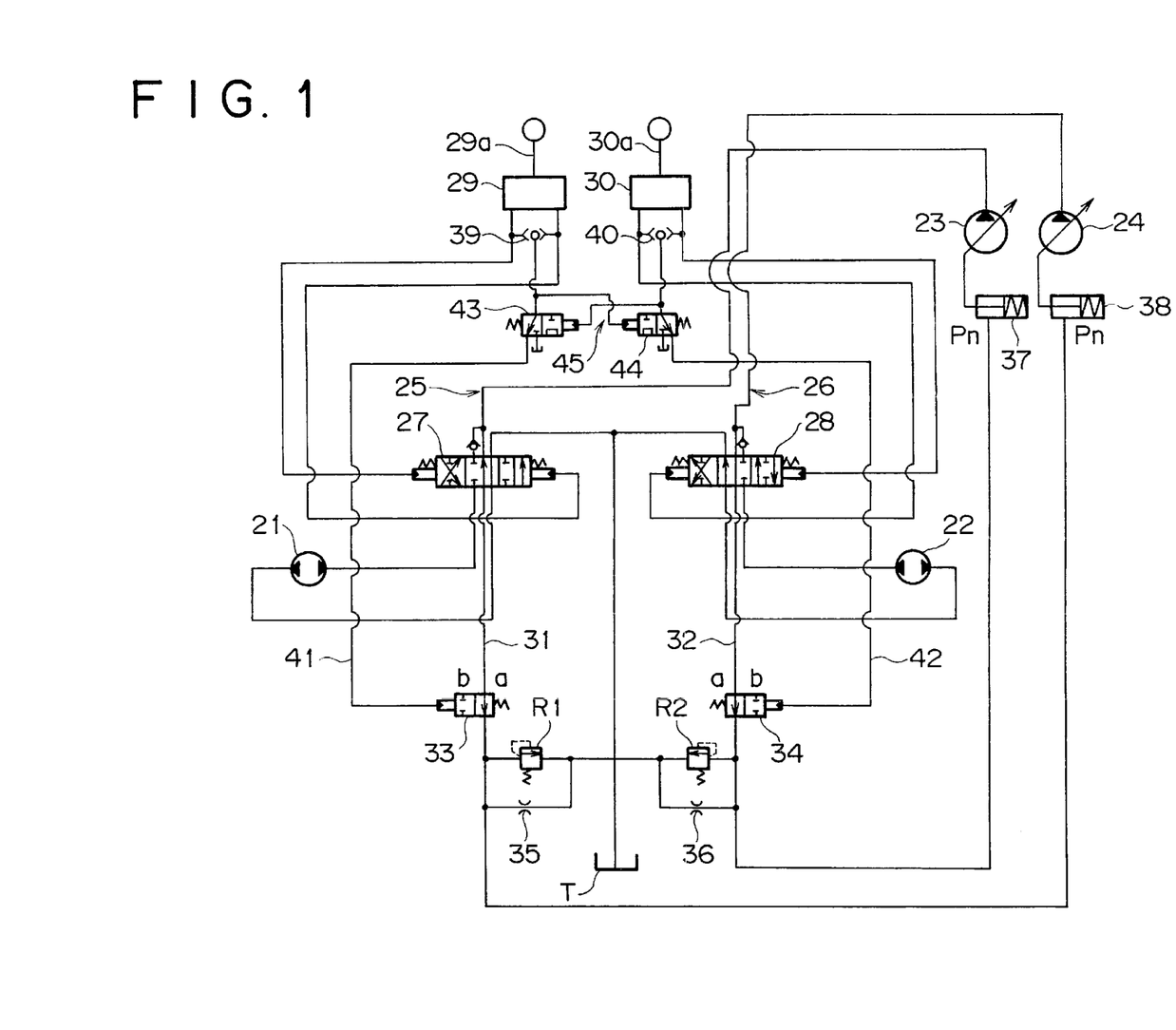
FIG. 1 is a schematic diagram of a hydraulic circuit according to a first embodiment of the present invention.

First Embodiment (FIG. 1)

In the first embodiment, among cut valve control systems, a hydraulic pilot type cut valve which is controlled by remote control pressure is employed.

In FIG. 1, the numeral 21 is a left traveling motor and 22 is a right traveling motor. Hydraulic pilot type left and right traveling control valves 27 and 28 which control the rotational direction and rotational speed of two motors 21 and 22 are installed in motor circuits 25 and 26 which connect both traveling motors 21 and 22 and left and right traveling pumps 23 and 24 having variable flow rate. The control valves 27 and 28 are manipulated by remote control valves 29 and 30 as an operating means. And the numerals 29a and 30a are the levers of remote control valves 29 and 30.

Bypass lines 31 and 32 for passing through the both control valves 27 and 28 are installed between two pumps 23 and 24, and a tank T. Also, there are hydraulic pilot type cut valves 33 and 34 for performing variable throttle action in the low portion of the control valves 27 and 28 of the bypass lines 31 and 32.

Negative control valves 35 and 36 are installed in even lower portion of the cut valves 33 and 34. The negative control pressure, Pn, generated by the negative control valves 35 and 36 are supplied to regulators 37 and 38 of the pumps 23 and 24. That is, the discharge flow rate varies depending on the different thrust of the pumps 23 and 24 by the negative control pressure, Pn.

As shown in FIG. 1, when the pilot pressure is not yet supplied, the cut valves 33 and 34 are at "a" opening position. In addition, the opening is tightened by operating a stroke on a closing position "b" according to the pilot pressure's magnitude during the pilot pressure supply.

As a means for controlling the cut valves 33 and 34, while shuttle valves 39 and 40 for withdrawing the remote control pressure according to the control input of the remote control valves 29 and 30 is installed in the output side of the both remote control valves 29 and 30, hydraulic pilot type traveling switching valves 43 and 44 for opening and closing cut valve pilot lines 41 and 42 for connecting the output port of the shuttle valves 39 and 40 and the pilot port of the cut valves 33 and 34 are installed in the cut valve pilot lines 41 and 42.

Hereinafter, the remote control valves 29 and 30, the cut valves 33 and 34, and the traveling switching valves 43 and 44 will be distinguished into the right- or the left-, similar to the left traveling motor 21 and the right traveling motor 22.

First of all, a switching valve control circuit 45 connects the input side and the pilot port of the traveling switching valves 43 and 44, respectively. And, the remote control pressure withdrawn by the shuttle valves 39 and 40, under the direction of the switching valve control circuit 45, is induced to the opposite side traveling switching valves 43 and 44 in the form of a pilot pressure (e.g., During the left traveling, the left remote control pressure from the left remote control valve 29 is induced to the right traveling switching valve 44 in the form of the pilot pressure).

The following explains the general function of the device.

A. During the Double Traveling Operation

During the double traveling in which the both remote control valves 29 and 30 are simultaneously operated with an equal amount, the equivalent remote control pressure is withdrawn for both shuttle valves 39 and 40. Since the traveling switching valves 43 and 44 are closed by this remote control pressure, no pilot pressure is supplied to the cut valves 33 and 34.

Therefore, both cut valves 33 and 34 are set at the opening position, "a", and no active throttle action are carried out here. In result, the pump pressure (generated by the motor circuits 25 and 26) applied to two traveling motors 21 and 22 is not influenced by the tightening of the cut valves 33 and 34 at all.

In other words, compared with the single traveling which will be described later, the motors 21 and 22 are gently operated complying with the properties of the pump pressure that change depending on the control input.

B. During the Single Traveling Operation

As shown in FIG. 1, in case of the right traveling which the right remote control valve 30 is only operated, the right traveling switching valve 44 opens because, the left remote control valve 29 is not being operated.

Accordingly, the remote control pressure from the right remote control valve 30 is supplied to the right cut valve 34 in the form of the pilot pressure, and the cut valve 34 at the closing position "b" is operated, thereby throttling the opening.

In this state where the right control valve 28 is tightened, and the right cut valve 34 starts another tightening, the pump pressure for the single traveling increases in its earlier stage, compared with the case of double traveling.

In addition, in the same state, compared with that of the double traveling, the cut valve passing flow rate is low, and the negative control pressure, Pn, generated in the negative control valves 35 and 36 is low, which consequently increases the pump discharge flow rate.

Due to the increase in the tightening process and the pump flow rate, the right traveling motor 22 is operated even in an area with a low control input.

In short, the properties of the pump pressure are different for the single traveling and for the double traveling. That is, during the single traveling, the traveling motor 21 or 22 is operated on the basis of the pump pressure property that the change in the pump pressure to the control input is relatively more rapid when compared with the double traveling. In this way, compared to the case where no control is present, the control input necessary for the single traveling operation is decreased, while the control input after the operation is increased. In consequence, the micro-operation within the range of the control input after the operation gets much better.

It is also possible to set the properties of the pump pressure for the single traveling and the double traveling so that the control input necessary for the traveling operation for the single traveling and the double traveling can be equivalent to each other. According to this, the differences between the single traveling operation and the double traveling operation are resolved to a great extent, and better quality of manipulation facility is obtained.

Figure 2:
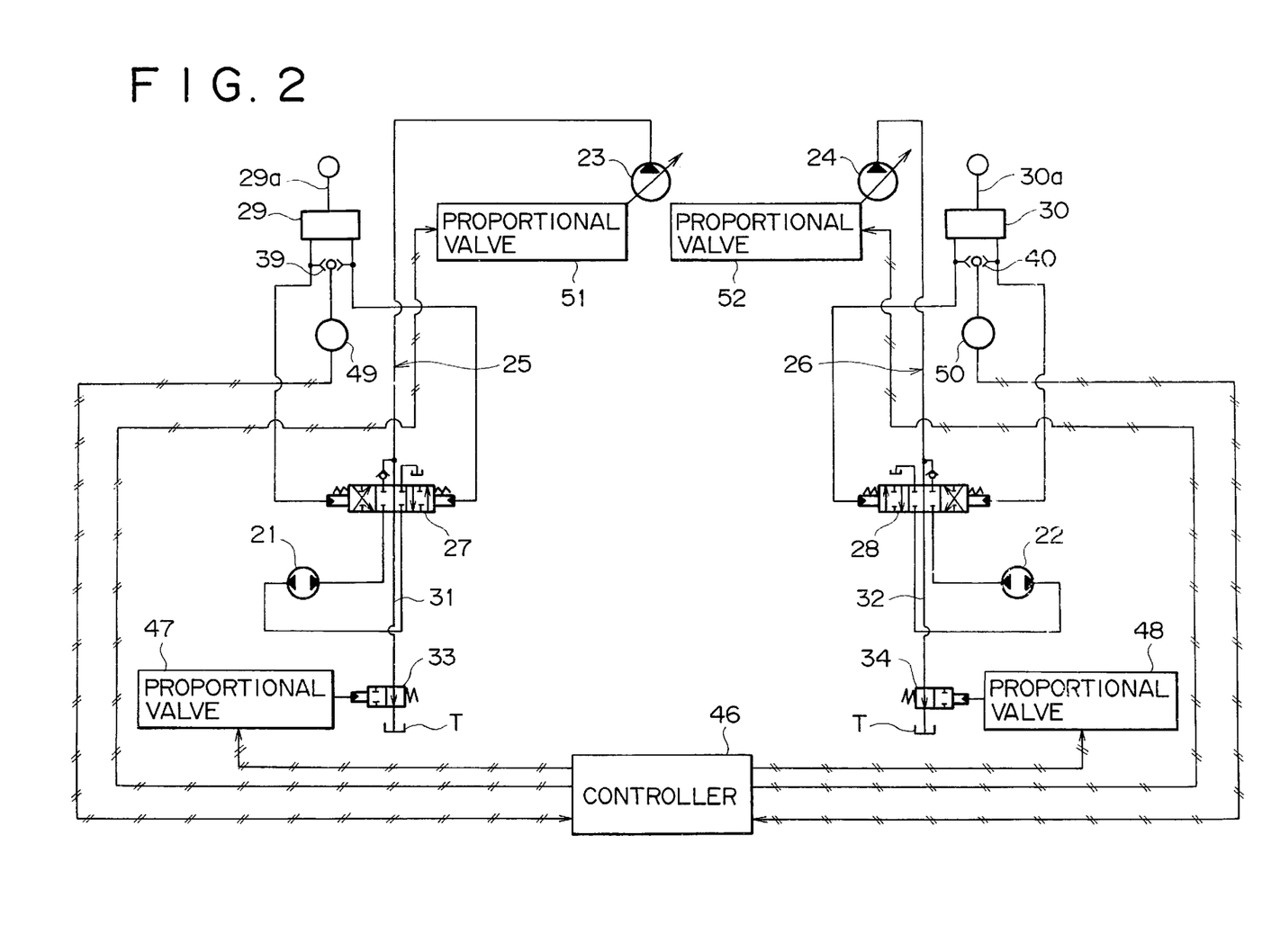
FIG. 2 is a schematic diagram of a hydraulic circuit and a control system thereof according to a second embodiment of the present invention.
Figure 3:
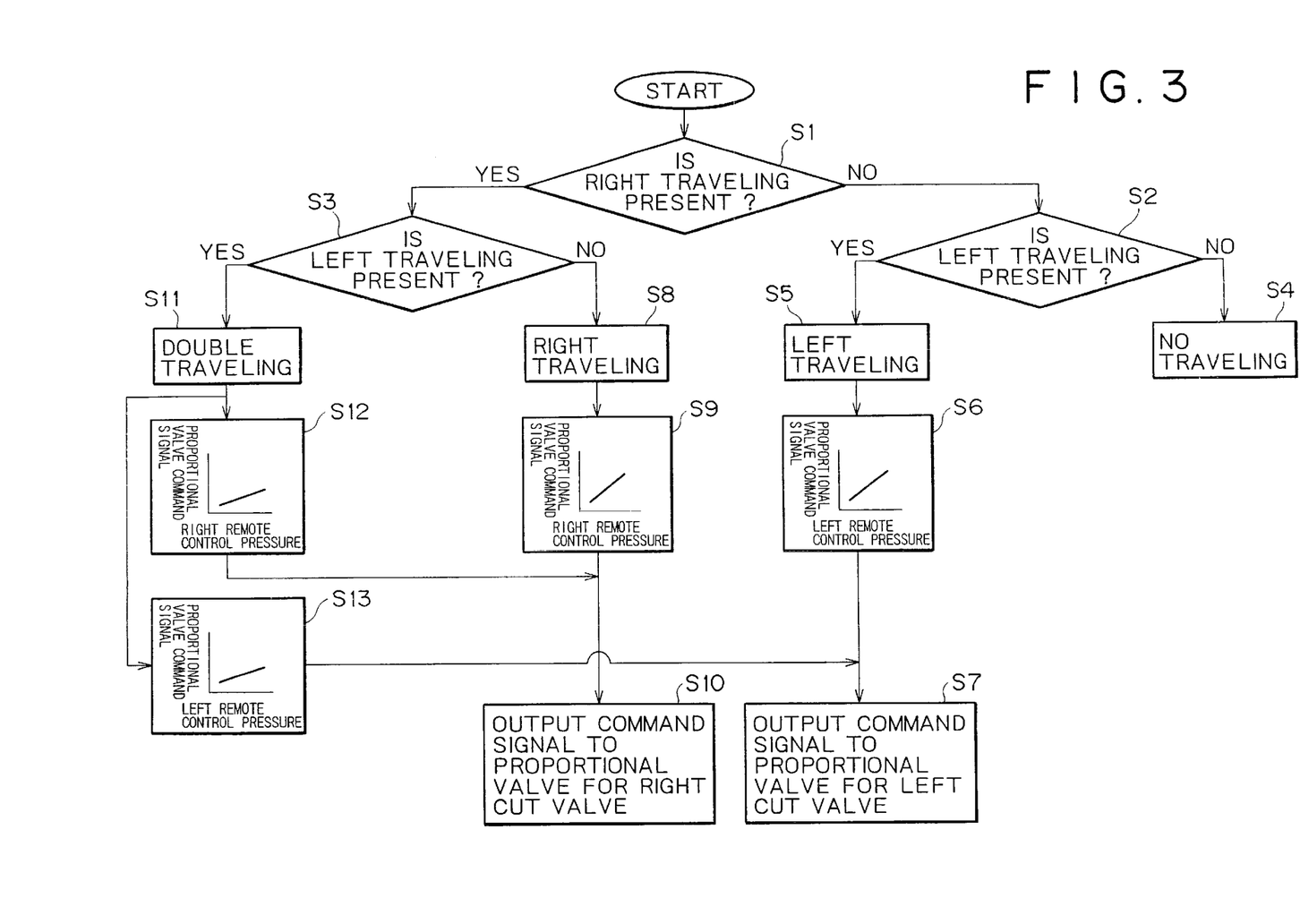
FIG. 3 is a flow chart explaining operational function of a controller shown in the second embodiment.

Second Embodiment (FIGS. 2 and 3)

In the second embodiment, a cut valve electronic control system for controlling cut valves 33 and 34 through electromagnetic type proportional valves 47 and 48 under the direction of an electric control signal from a controller 46 is particularly introduced.

Hereinafter, only the differences between the cut valve electronic control system and the hydraulic control system will be explained. First of all, the remote control pressure from the remote control valves 29 and 30 is withdrawn by pressure meters 49 and 50 via the shuttle valves 39 and 40, and is later inputted in the controller 46 in the form of an operational signal.

The controller 46, based on the operational signal, decides whether it is the single traveling or the double traveling (if the single traveling only is concerned, it decides whether it is the left traveling or the right traveling). And, during the single traveling, a control signal is outputted for tightening the opening of the cut valve 33 or 34 at one side of the proportional valves 47 and 48 for cut valve.

Pump controlling proportional valves 51 and 52 as the regulator are installed in two pumps 23 and 24. During the single traveling, a signal for increasing the pump flow rate is outputted to the pump controlling proportional valves 51 and 52 from the controller 46, as an alternative operation of the negative control valves 35 and 36 explained in the First Embodiment.

The detailed function of the controller 46 is now explained with reference to a flow chart shown in FIG. 3.

At the time of initiation of the control, the traveling type is determined based on the operational signal, and it is decided the presence of 'the right traveling' (S1). Here, regardless of the result decision as NO or YES, the presence of the left traveling is also decided in the steps of S2 and S3.

If the decision is NO in the step S2, it is regarded as 'No traveling' since there is no traveling operation is made.

On the other hand, if the decision made in the step S2 is YES, it is regarded as the 'Left traveling' (S5). Also, as shown in the step S6, the command signal with a large variation slope is selected for the proportional valves 47 and 51 for the left cut valve that control the left pump on the remote control pressure, and the command signal based on the properties is outputted to the same proportional valves 47 and 51 (S57).

On the other hand, if the decision made in the step S3 is NO, it is regarded as the 'Right traveling' (S8). And, the similar properties manifested in the step S6 are selected in the step S9 as well. Then, the command signal complying with the properties is outputted to the same proportional valves 48 and 52 (S10).

However, if the decision made in the step S3 is YES, it is regarded as the 'Double traveling' (S11). And, as for the variation rate of the command signal on the remote control pressure, more gentle traveling properties than those of 'single traveling' are selected (S12 and S13). Later, an appropriate command signal is outputted according to the properties of the proportional valves 47 and 48 for the cut valve, and the pump controlling proportional valves 51 and 52 (S10 and S7).

Under the same control, similar to the First Embodiment, the traveling motor 21 or 22 is operated based on the properties of the pump pressure during the single traveling where the pump pressure changes more rapidly according to the control input, compared with the double traveling.

Incidentally, in both embodiments 1 and 2, the cut valves 33 and 34 may be closed during the single traveling, and open during the double traveling. In doing so, however, the continuity of the operation may be lost due to the rapid changes in the properties from the single traveling to the double traveling. Thus, for both single traveling and double traveling, it is highly recommended to adjust the opening the cut valves 33 and 34 by way of preventing the sudden changes in the properties.

Figure 4:
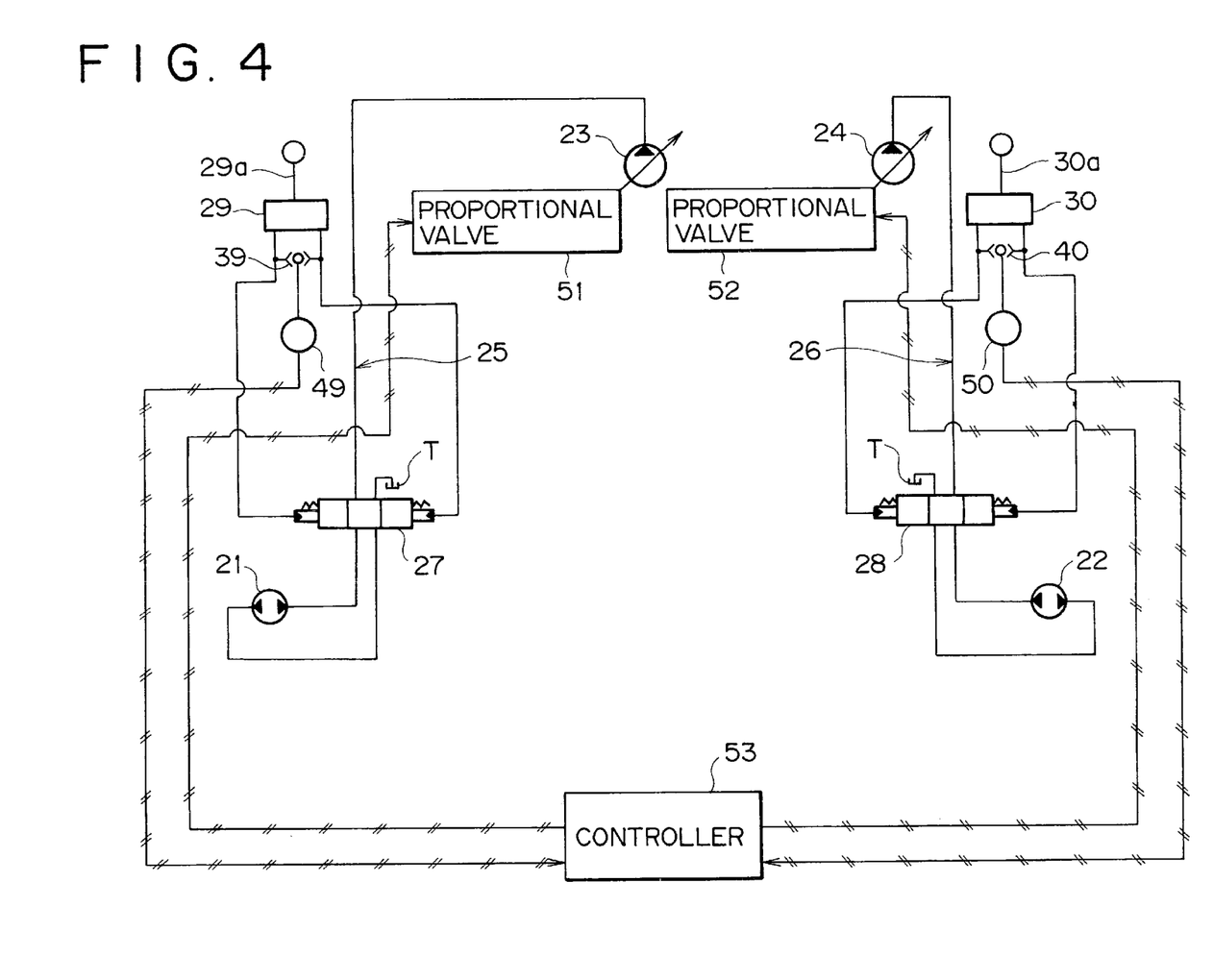
FIG. 4 is a schematic diagram of a hydraulic circuit and a control system thereof according to a third embodiment of the present invention.
Figure 5:
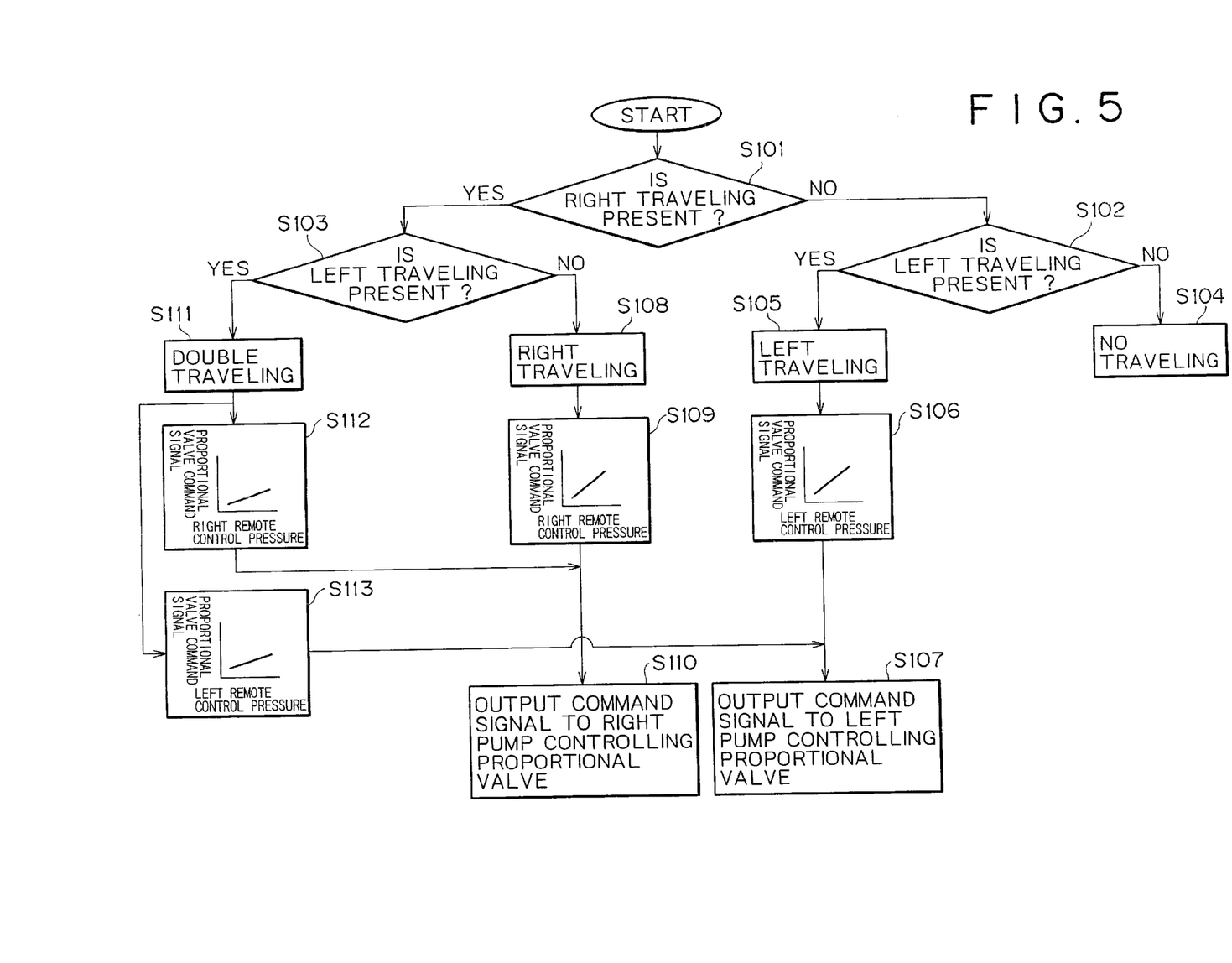
FIG. 5 is a flow chart explaining operational function of a controller shown in the third embodiment.

Third Embodiment (FIGS. 4 and 5)

Unlike to the other embodiments illustrated before, a pump control system is introduced this time.

That is, the cut valves 33 and 34 employed in the first and the second embodiments are not used. Instead, the remote control pressure withdrawn by the shuttle valves 39 and 40, and the pressure meters 49 and 50 is sent out to the controller 53 in the form of an operational signal. Based on this operational signal, the system is constituted in such way that, in case of the single traveling, a command signal is outputted to increase the pump flow rate from the controller 53 for the pump controlling proportional valves 52 and 52, while in case of the double traveling, the command signal is outputted to decrease the pump flow rate.

More detailed operation is now explained with reference to a flow chart illustrated in FIG. 5.

At the time of initiation of the control, similar to the Second Embodiment (FIG. 3), it is decided (going through the steps of S101 through S 103) the presence of 'No traveling', 'Right traveling', 'Left traveling', or 'Double traveling' based on the operational signal (S104, S105, S108, and S111). When either 'Left traveling' or 'Right traveling' is decided, as shown in the steps of S106 or S109, a command signal is selected to be changed to a large slope to the remote control pressure for the pump controlling proportional valve 51 or 52, and the selected command signal is then outputted to the same proportional valve 51 or 52 (S107 and S110).

On the other hand, if the 'Double traveling' is decided, the variation rate of a command signal against the remote control pressure is selected in such way that a gentler traveling properties than the 'Single traveling' is manifested (S112 and S113). And, a command signal complying with the properties of the proportional valves 51 and 52 for the both pump is outputted (S110 and S107).

Under this control system, the pump flow rate is relatively high for the single traveling, compared with the double traveling. Also, similar to First Embodiment, the traveling motor 21 or 22 is operated based on the pump pressure property that the change in the pump pressure according to the control input for the single traveling is more rapid, compared with that of the double traveling.

Other Embodiments (1) Each embodiment described above concerns control systems that are actually very realistic for use. For example, the pump pressure control system has been explained primarily based on the pump pressure property that the variation slope of the control input for the single traveling is comparatively high, while it is low for the double traveling. However, the present invention introduces the device for controlling the pump pressure based on other properties of the pump pressure.

(2) In the First and Second Embodiments, for example, the cut valves 33 and 34 have been used as the pressure control valve, and the opening of the cut valves 33 and 34, respectively, was regulated by way of controlling the pump pressure. However, the present invention also showed that it is possible to install the set pressure variable relief valve in the motor circuits 25 and 25 instead of the cut valves 33 and 34 in order to control the pump pressure by controlling the set pressure of the relief valve.

(3) In each Embodiment described in the above introduced only the cases of the remote control valve system using the remote control valves 29 and 30 as the operating means. In contrast, the present invention introduced the electronic control system in which the lever (or pedal) control input is converted to an electric signal using a potentiometer, and is later inputted in the controller. Then, the controller valve is controlled by the control signal from the controller.

(4) The present invention is not limited in the hydraulic excavator, but can be applied to other traveling machinery (e.g., a crawler type crane) that operates both single traveling and the double traveling.

I claim:

1. A traveling control device, comprising:
   crawler type right and left traveling bodies;
   right and left hydraulic motors for operating said right and left traveling bodies using each hydraulic pump as a hydraulic source;

an operating means for outputting an operation command to the right and the left hydraulic motors; and a pump pressure control means for controlling pump pressure to be supplied to the right and the left hydraulic motors according to a control input of the operating means, wherein the pump pressure control means controls the pump pressure based on different pump pressure properties for single traveling in which only one of the hydraulic motors is operated, and for double traveling in which both of the hydraulic motors are simultaneously operated.

2. The traveling control device according to claim 1, wherein said pump pressure control means controls the pump pressure based on a pump pressure property that a variation slope of the pump pressure to the control input grows more rapidly for the single traveling, compared with that of the double traveling.

3. The traveling control device according to claim 2, wherein said pump pressure control means controls the pump pressure based on a pump pressure property that the control input necessary for a traveling operation for the single traveling and the double traveling is almost equivalent to each other.

4. The traveling control device according to claim 1, wherein said pump pressure control means further comprises:

a pressure control valve connected to a motor circuit that connects said hydraulic pump with said hydraulic motor; and a set pressure adjusting means for adjusting a set pressure of the pressure control valve according to the control input of the operating means.

5. The traveling control device according to claim 4, wherein said pressure control valve is preferably a cut value, the cut value is installed in bypass line passing through a control valve for controlling the operation of the right and the left hydraulic motors, and the set pressure adjusting means controls an opening of the cut valve.

6. The traveling control device according to claim 5, wherein hydraulic pilot type valves are preferably employed respectively for the control valve and the cut valve, a remote control valve is used as an operating means for operating said control valve, and said set pressure adjusting means is comprised of a shuttle valve for withdrawing a remote control pressure from said remote control valve; a cut valve pilot line for connecting the shuttle valve and a hydraulic pilot port of said cut valve; a traveling switching valve of the hydraulic pilot type for closing and opening the cut valve pilot line; and a switching valve control circuit for supplying the remote control pressure of the operated side to the traveling switching valve of the opposite side as a pilot pressure to a closing direction of the traveling switching valve.

7. The traveling control device according to claim 5, further comprising a regulator for regulating a discharge flow rate of the right and the left hydraulic pumps, and a negative control valve installed in the bypass line for changing the discharge flow rate of a pump by changing an input in said regulator in accordance with a passing flow rate of the bypass line.

8. The traveling control device according to claim 5, wherein the cut valve employed is either of a hydraulic pilot type or an electronic pilot type, and said set pressure adjusting means outputs an electric control signal for controlling an opening of said cut valve in accordance with the control input of the operating means.

9. The traveling control device according to claim 8, wherein said set pressure adjusting means includes a controller, and a proportional valve for the cut valve for supplying a secondary pressure according to the electric control signal from the controller to the hydraulic pilot type cut valve as a pilot pressure.

10. The traveling control device according to claim 9, further comprising a regulator for regulating a discharge flow rate of the right and the left hydraulic pumps, to which said controller outputs a signal for changing the discharge flow rate of the pump.

11. The traveling control device according to claim 10, wherein said regulator is a pump controlling proportional valve.

12. The traveling control device according to claim 9, wherein a remote control valve is used as said operating means, and the remote control pressure withdrawn by the remote control valve is inputted in said controller as an operational signal.

13. The traveling control device according to claim 4, wherein said pressure control valve is a relief valve, having a variable set relief pressure and installed in the motor circuit, and the set pressure of the relief valve being controlled by said set pressure adjusting means.

14. The traveling control device according to claim 1, wherein said pump pressure control means is comprised of a regulator for regulating a discharge flow rate of the right and the left hydraulic pumps, and a controller for sending a command signal on the discharge flow rate out to said regulator in accordance with the control input of said operating means.

15. The traveling control device according to claim 14, wherein said regulator is a pump controlling proportional valve.

16. The traveling control device according to claim 14, wherein a remote control valve is used as said operating means, and a remote control pressure withdrawn by the remote control valve is inputted in said controller as an operational signal.

* * * * *